United States Patent
Ogawa

(10) Patent No.: US 8,020,781 B2
(45) Date of Patent: Sep. 20, 2011

(54) OPERATION UNIT

(75) Inventor: Satoshi Ogawa, Aichi (JP)

(73) Assignee: Kabushiki Kaisha Tokai Rika Denki Seisakusho, Aichi (JP)

( * ) Notice: Subject to any disclaimer, the term of this patent is extended or adjusted under 35 U.S.C. 154(b) by 431 days.

(21) Appl. No.: 12/257,872

(22) Filed: Oct. 24, 2008

(65) Prior Publication Data

US 2009/0108083 A1    Apr. 30, 2009

(30) Foreign Application Priority Data

Oct. 26, 2007   (JP) .................................. 2007-278815

(51) Int. Cl.
*G05D 23/00*   (2006.01)
(52) U.S. Cl. ................. 236/94; 62/125; 362/29
(58) Field of Classification Search ............... 236/94; 62/125; 165/11.1; 362/23, 27, 29
See application file for complete search history.

(56) References Cited

U.S. PATENT DOCUMENTS

| | | | |
|---|---|---|---|
| 4,321,655 A | 3/1982 | Bouvrande | 362/29 |
| 4,800,466 A | 1/1989 | Bauer et al. | 362/26 |
| 4,930,048 A | 5/1990 | Ito | 362/26 |
| 6,155,691 A | 12/2000 | Miyasaka | 362/30 |
| 6,223,610 B1 * | 5/2001 | Ishiguro et al. | 74/10.41 |
| 6,521,848 B2 * | 2/2003 | Shibata et al. | 200/5 R |
| 7,811,160 B2 * | 10/2010 | Ogawa et al. | 454/121 |

FOREIGN PATENT DOCUMENTS

| EP | 0 933 792 A1 | 8/1999 |
|---|---|---|
| JP | 3317848 B | 6/2002 |

* cited by examiner

*Primary Examiner* — Marc Norman
(74) *Attorney, Agent, or Firm* — Morgan, Lewis & Bockius LLP

(57) ABSTRACT

An operation unit includes: a plurality of operation members provided in an air conditioning system for conditioning air inside a passenger compartment of a vehicle in such a manner as to be operated to control the air conditioning system; a first rear-side member provided on a rear side of one of the plurality of operation members; at least one second rear-side member provided on a rear side of the operation members on which the first rear-side member is not provided; and an electrical functioning portion which is provided on the first rear-side member and has electrical functions for the operation member on which the rear-side member is provided and the operation members on which the second rear-side member is provided.

3 Claims, 4 Drawing Sheets

OPERATION UNIT

BACKGROUND OF THE INVENTION

The present invention relates to an operation unit for controlling an air conditioning system by operation members being operated.

As an operation unit, there is an operation unit in which a plurality of operation members such as an air amount adjustment knob, a temperature control knob and key tops are on an operation panel (for example, refer to Japanese Patent No. 3317848).

In this operation unit, rear sides of the plurality of operation members are covered by a case, and a printed circuit board is attached to a rear side of the case. Lamps and light emitting diodes are provided on the printed circuit board, and the lamps and light emitting diodes are inserted into an interior of the case for illuminating the plurality of operation members.

In this operation unit, however, the rear sides of the plurality of operation members are covered by only the single case. Because of this, when the design of the operation unit is changed by changing the arrangement of the plurality of operation members on the operation panel, the case cannot cover the rear sides of the plurality of operation members so changed in their arrangement, whereby there is caused a problem that the design of the operation unit is difficult to be changed and hence, the degree of freedom in changing the design of the operation unit is reduced.

Here, when the case is divided into a plurality of cases, even in the event that the arrangement of the plurality of operation members on the operation panel is changed so as to change the design of the operation unit, the rear sides of the plurality of operation members can be covered by the plurality of cases. Because of this, the degree of freedom in design of the operation unit can be increased.

In this case, however, in the event that a printed circuit board is provided for each case, the necessity is caused of providing a lamp or a light emitting diode for each printed circuit board and this then causes the necessity of connecting a wiring harness to each printed circuit board, leading to a problem that the production costs are increased.

SUMMARY OF THE INVENTION

The invention has been made in view of the situations and an object thereof is to provide an operation unit which can reduce the production costs.

According to a first aspect of the invention, there is provided an operation unit comprising:

a plurality of operation members provided in an air conditioning system for conditioning air inside a passenger compartment of a vehicle in such a manner as to be operated to control the air conditioning system;

a first rear-side member provided on a rear side of one of the plurality of operation members;

at least one second rear-side member provided on a rear side of the operation members on which the first rear-side member is not provided; and an electrical functioning portion which is provided on the first rear-side member and has electrical functions for the operation member on which the rear-side member is provided and the operation members on which the second rear-side member is provided.

According to a second aspect of the invention, there is provided an operation unit as set forth in the first aspect of the invention, wherein the electrical functioning portions illuminate the operation member on which the first rear-side member is provided and the operation member on the second rear-side member is provided.

In the operation unit set forth in the first aspect of the invention, the plurality of operation members are provided in the air conditioning system for conditioning air inside the passenger compartment of the vehicle, and the air conditioning system is controlled by the operation members being operated. In addition, the first and second rear-side members are provided on the rear sides of the plurality of operation members.

Here, the electrical functioning portion provided on the rear-side member has not only the electrical function for the operation member on which the first rear-side member having the electrical functioning portion is provided but also the electrical function for the operation member on which the second rear-side member is provided. Because of this, the necessity of providing an electrical functioning portion for each rear-side member can be obviated, thereby making it possible to reduce the production costs.

In the operation unit set forth in the second aspect of the invention, the electrical functioning portion has not only the electrical function for the operation member on which the first rear-side member having the electrical functioning portion is provided but also the electrical function for the operation member on which the second rear-side members having no electrical functioning portion is provided. Because of this, the production costs can effectively be reduced.

DETAILED DESCRIPTION OF PREFERRED EMBODIMENTS

Figure 1:
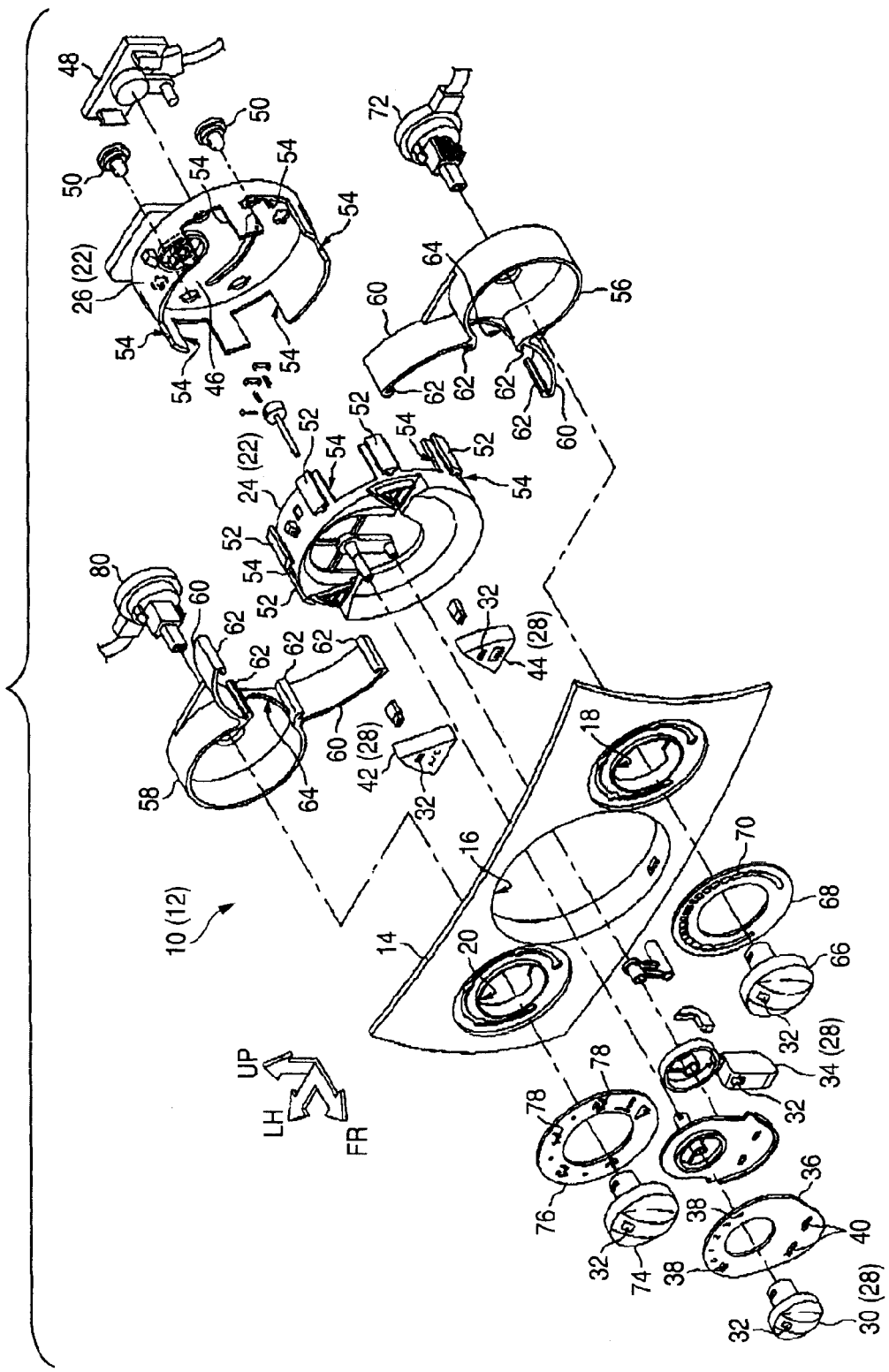
FIG. 1 is an exploded perspective view showing a heater operation unit according to an embodiment of the invention as viewed obliquely from the right of a front side thereof.
Figure 2:
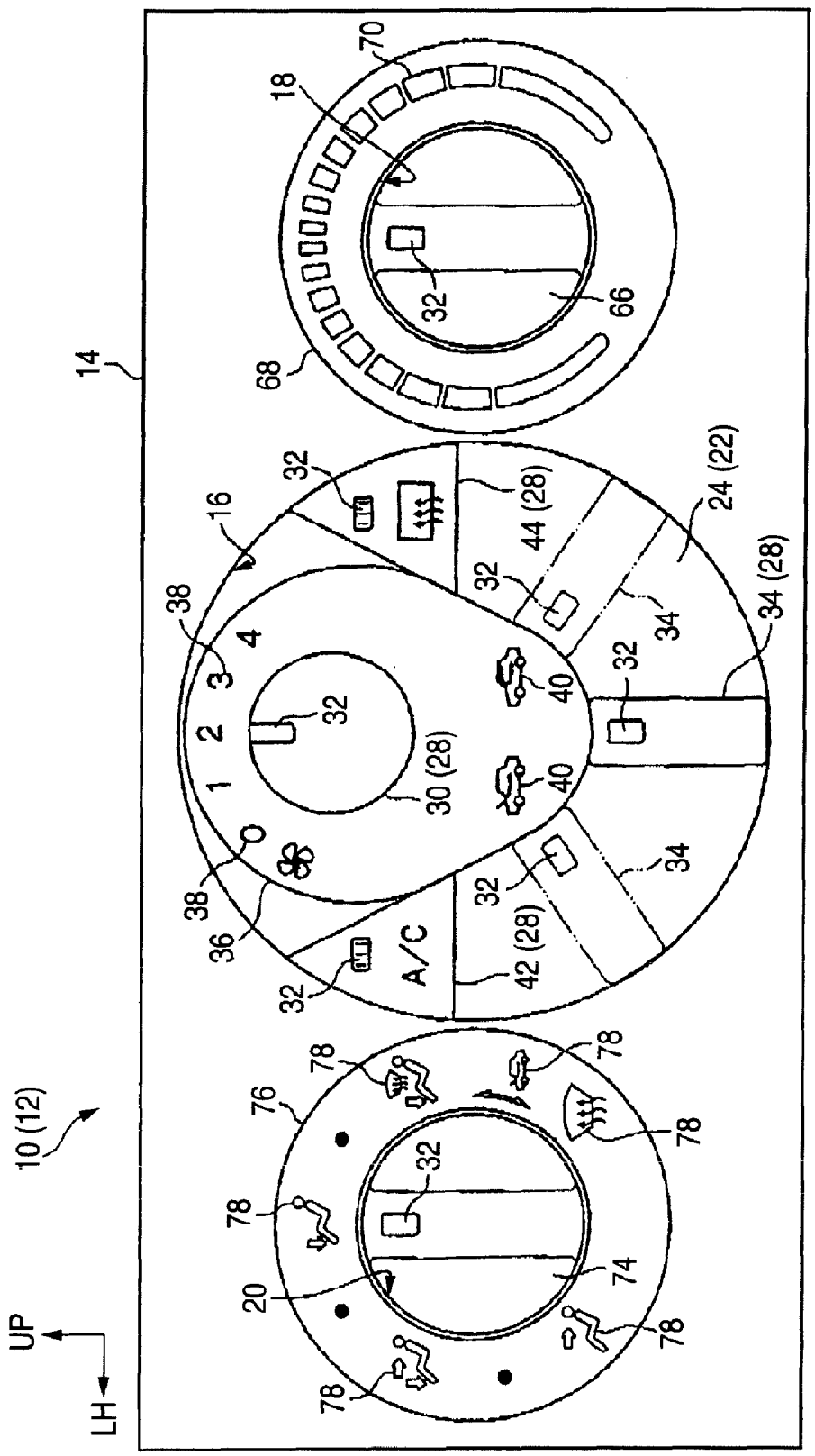
FIG. 2 is a front view showing the heater operation unit according to the embodiment of the invention as viewed from the front side thereof.

FIG. 1 is an exploded perspective view of a heater operation unit 10 according to an embodiment which is configured by applying an operation unit of the invention thereto which shows the operation unit 10 as viewed obliquely from the right of a front side thereof, and FIG. 2 shows is a front view of the heater operation unit 10 as viewed from the front side thereof. Note that in the drawings, the front side (the side facing the rear of the vehicle) of the heater operation unit 10 is indicated by an arrow FR, a left-hand side of the heater operation unit (a left-hand side of the vehicle) is indicated by an arrow LH, and an upper side of the heater operation unit 10 (an upper side of the vehicle) is indicated by an arrow UP.

The heater operation unit 10 according to the embodiment is provided on an instrument panel (whose illustration is omitted) of the vehicle, and the front side of the heater operation unit 10 is oriented towards the rear of the vehicle and is exposed to an inside of a passenger compartment of the vehicle. The heater operation unit 10 makes up part of an air conditioning system 12 (a heater) of the vehicle, and the air conditioning system 12 is made to condition air inside the passenger compartment of the vehicle.

A substantially plate-shaped cluster panel 14 is provided on the heater operation unit 10 as a front-side member, and the cluster panel 14 makes up part of the instrument panel. A circular central hole 16 is formed in a horizontal center of the cluster panel 14 in such a manner as to penetrate the same panel. In addition, a right-hand side hole 18 and a left-hand side hole 20, which are both circular in shape, are formed in a right-hand side portion and a left-hand side portion of the cluster panel 14, respectively, in such a manner as to penetrate the same panel.

A circularly tubular container-like central body 22 (a main body) is provided within the central hole 16. The central body 22 is made up as a rear-side member by combining a front-side substantially bottomed circularly tubular front body 24 with a rear-side substantially bottomed circularly tubular rear body 26, and a circumferential wall of the rear body 26 is fitted in the inside of a circumferential wall of the front body 24.

A central operation part 28 is provided on a front side of the central body 22 (the front body 24).

A blower dial 30 (a rotary knob) is rotatably supported as an operation member at an upper portion on the front side of the central body 22 (the front body 24), and by the blower dial 30 being operated to rotate, the blowing of air into the passenger compartment by the air conditioning system 12 is switched on/off, and the volume of air sent into the passenger compartment by the air conditioning system 12 is controlled. A light guiding path 32 as an illuminating portion is provided within the blower dial 30, and the light guiding path 32 is made to transmit light therethrough. A front surface of the light guiding path 32 is exposed to the passenger compartment, and the light guiding path 32 is made to communicate with the inside of the central body 22 on a rear side thereof.

An F/R lever 34 (a fresh outside air/recirculated air knob) is supported as an operation member at a lower portion on the front side of the central body 22 (the front body 24) in such a manner as to rotate about an upper portion thereof, and by the F/R lever being operated to rotate, the mode of the air conditioning system 12 in which air is sent into the passenger compartment is switched (between a mode of introducing fresh outside air to send it into the passenger compartment and a mode of circulating air inside the passenger compartment to recirculate it inside the passenger compartment). A light guiding path 32, which is the same as the aforesaid light guiding path 32, is provided inside the F/R lever 34, and a front surface of the light guiding path 32 is exposed to the passenger compartment, while the light guiding path 32 is made to communicate with the interior of the central body 22 on a rear side thereof.

A flat plate-shaped central indicator panel 36 is provided as a display member at an upper portion on the front side of the central body 22 (the front body 24), and a front surface of the central display panel 36 is exposed to the passenger compartment.

Air current volume indications 38 indicating volumes of air to be sent into the passenger compartment by the air conditioning system 12 and an air current creating symbol are provided at an upper end portion of the central indicator panel 36 which confronts the front surface of the light guiding path 32 of the blower dial 30, and the central indicator panel 36 has a light transmission property at the portion where the air current volume indications 38 are provided and is made to communicate with the interior of the central body 22 on a rear side of the same portion.

Mode indications 40 indicating the modes of the air conditioning system 12 in which air is sent into the passenger compartment by the air conditioning system 12 are provided at a lower end portion of the central indicator panel 36 which confronts the front surface of the light guiding path 32 of the F/R lever 34, and the central indicator panel 36 has a light transmission property at the portion where the mode indications 40 are provided and is made to communicate with the interior of the central body 22 on a rear side of the same portion.

An A/X switch 42 (an A/C knob) is supported at a left end portion on the front side of the central body 22 (the front body 24) in such a manner as to be depressed, and by the A/C switch 42 being operated to be depressed, the air conditioning system 12 is switched on or off in such a manner that the air conditioning system switches on an air temperature controlling function to send air whose temperature is controlled into the passenger compartment or the air conditioning system switches off the air temperature controlling function to send air whose temperature is not controlled into the passenger compartment. A light guiding path 32, which is the same as the aforesaid light guiding path 32, is provided inside the A/C switch 42, and a front surface of the light guiding path 32 is exposed to the passenger compartment and is made to communicate with the interior of the central body 22 on a rear side thereof.

Inside the central body 22, an electric circuit 46 is provided on a bottom wall of the rear body 26, and the electric circuit 46 is made as an insert molded part (an insulator) in the rear body 26 and is electrically connected to the blower dial 30, the A/C switch 42 and a rear defogger switch 44. A wiring harness (whose illustration is omitted) is electrically connected to the electric circuit 46, and the wiring harness is electrically connected to a operation part (whose illustration is omitted) of the air conditioning system 12.

An F/R cable 48 is provided as a connecting mechanism on a rear side of the central body 22 (the rear body 26), and the F/R cable 48 is connected to the F/R lever 34 via the bottom wall of the rear body 26 and is also connected to the operation part of the air conditioning system 12. The F/R cable 48 is made to operate by the F/R lever 34 being operated to rotate, and the bottom wall of the rear body 26 permits the operation of the F/R cable 48 by the F/R lever 34 being operated to rotate.

Lamps 50 are provided as electrical functioning portions (illuminating means) at a right-hand side portion and a left-hand side portion on the rear side of the central body 22 (the rear body 26), and the lamps 50 are inserted into the interior of the central body 22 and are electrically connected to the electric circuit 46. The lamps 50 are made to illuminate the interior of the central body 22, and the air current volume indications 38 and the mode indications 40 of the central indicator panel 36 and the light guiding paths 32 of the blower dial 30, the F/R lever 34, the A/C switch 42 and the rear defogger switch 44 are made to be illuminated by light from the lamps 50.

Four pillar-like projections 52 each having a T-shaped cross section and making up an attaching means are provided integrally at each of a right-hand side portion and a left-hand side portion on a circumferential surface of the central body 22 (the front body 24), and eight projections 52 in total are disposed circumferentially at equal intervals on the central body 22.

Three rectangular communication holes 54 each making up a communication means are formed in each of a right-hand side portion and a left-hand side portion of a circumferential wall of the central body 22 (the front body 24 and the rear body 26) in such a manner as to penetrate the circumferential wall, and the projections 52 are disposed on both sides of the communication hole 54 in the circumferential direction of the central body 22.

Figure 3:
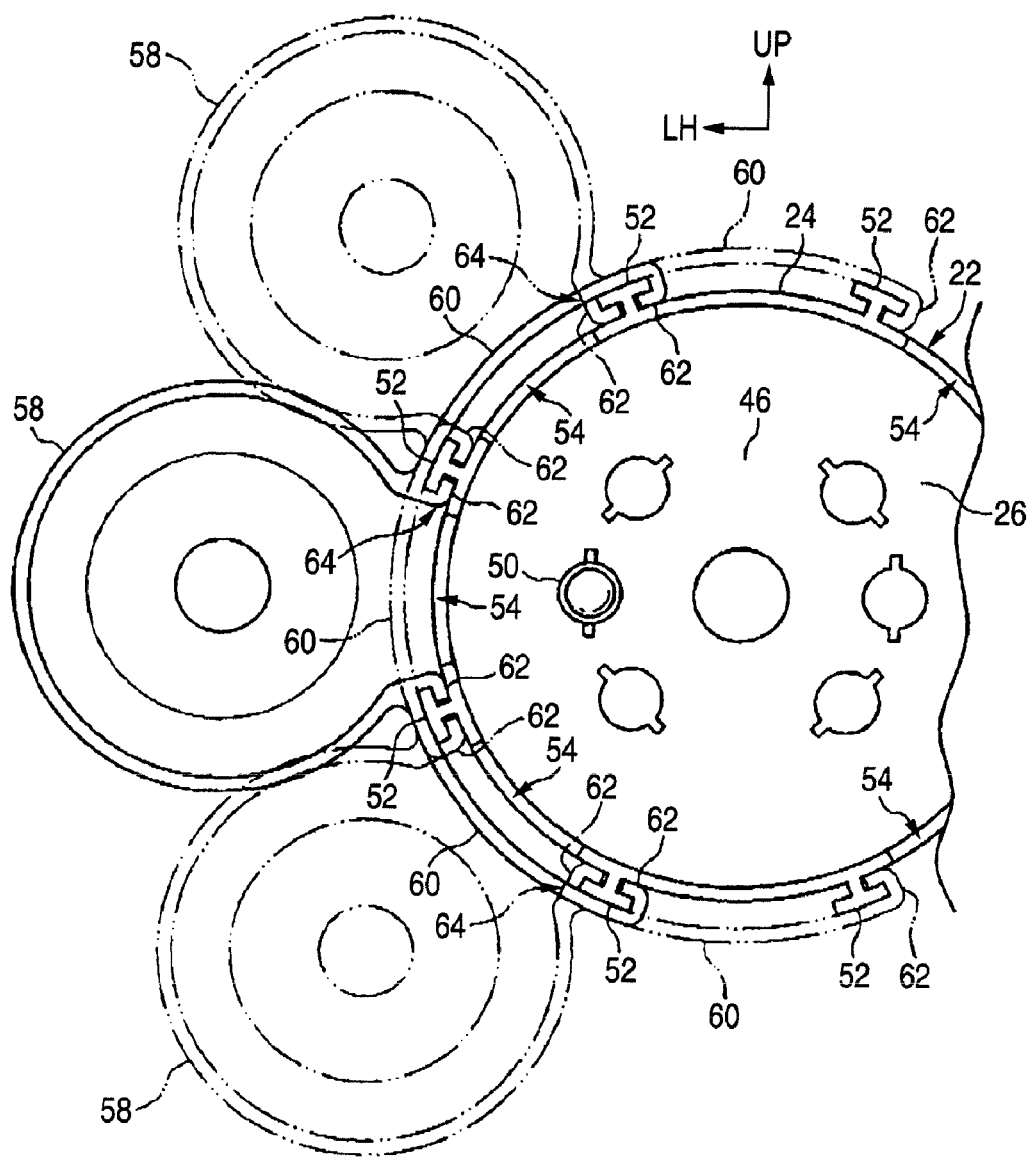
FIG. 3 is a sectional view showing a central body and a left body of the heater operation unit according to the embodiment of the invention as viewed from the front side of the heater operation unit.

As is shown in detail in FIG. 3, a substantially bottomed circularly tubular right body 56 (a sub-body) is attached to the right-hand side portion of the circumferential wall of the central body 22 as a rear-reside member, and a substantially bottomed circularly tubular left body 58 (a sub-body) is attached to the left-hand side portion of the circumferential wall of the central body 22. Proximal end portions of a pair of curved plate-shaped attaching legs 60 which make up an attaching means are provided integrally on each of a circumferential wall of the right body 56 at a portion lying to face the central body 22 (at a right-hand side portion) and a circumferential wall of the left body 58 at a portion lying to face the central body 22 (at a left-hand side portion), and in each pair, the attaching legs 60 extend upwards and downwards.

A plate-shaped engagement portion 62 having a U-shaped cross section is provided at a proximal end portion and a distal end portion of the attaching leg 60, and by the respective engagement portions 62 of the pair of attaching legs 60 of the right body 56 being brought into engagement with the respective projections 52 on the right-hand side portion of the central body 22, the right body 56 is attached to the right of (just beside) the central body 22, while by the respective engagement portions 62 of the pair of attaching legs 60 of the left body 58 being brought into engagement with the respective projections 52 on the left-hand side portion of the central body 22, the left body 58 is attached to the left of (just beside) the central body 22. In addition, by the projections 52 on the central body 22 being changed with which the respective engagement portions 62 of the pair of attaching legs 60 of the right body 56 are brought into engagement, the right body 56 is made to be attached to a portion of the central body 22 which lies obliquely upwards to the right or obliquely downwards to the right, while by the projections 52 on the central body 22 being changed with which the respective engagement portions 62 of the pair of attaching legs 60 of the left body 58 are brought into engagement, the left body 58 is made to be attached to a portion of the central body 22 which lies obliquely upwards to the left or obliquely downwards to the left.

A substantially rectangular through hole 64 making up a communication means is formed between the pair of attaching legs 60 on each of the circumferential wall of the right body 56 and the circumferential wall of the left body 58 in such a manner as to penetrate the circumferential wall, and an interior of the right body 56 and an interior of the left body 58 are each made to communicate with the interior of the central body 22 via the through hole 64 and the communication hole 54, whereby the lamps 50 are allowed to illuminate the interior of the right body 56 and the interior of the left body 58 via the interior of the central body 22, the communication holes 54 and the through holes 64.

The right body 56 and the left body 58 cover rear sides of the right-hand side hole 18 portion and the left-hand side hole 20 portion of the cluster panel 14, respectively.

An A/M dial 66 (a rotary knob) is rotatably supported as an operation member within the right-hand side hole 18 in the cluster panel 14, and by the A/M dial 66 being operated to rotate, the temperature of air is controlled which is sent into the passenger compartment when the air conditioning system 12 switches on the air conditioning function. A light guiding path 32, which is the same as the one described above, is provided in the A/M dial 66, and a front surface of the light guiding path 32 is exposed to the passenger compartment, while a rear side of the light guiding path 32 is made to communicate with the interior of the right body 56.

An annular disc-shaped temperature indication panel 68 is provided as an indication member on the front side of the cluster panel 14 in such a manner as to surround a circumference of the A/M dial 66, and a front surface of the temperature indication panel 68 is exposed to the passenger compartment. Temperature indications 70 which indicate temperatures of air that is sent into the passenger compartment by the air conditioning system 12 are provided on the temperature indication panel 68 in such a manner as to be associated with the front surface of the light guiding path 32 of the A/M dial 66. The temperature indication panel 68 has a light transmission property at the portion where the temperature indications 70 are provided and is made to communicate with the interior of the right body 56 on a rear side thereof.

An A/M cable 72 is provided as a connecting mechanism on a rear side of the right body 56, and the A/M cable 72 is connected to the A/M dial 66 via a bottom wall of the right body 56. The A/M cable 72 is made to operate by the A/M dial 66 being operated to rotate, and the A/M cable 72 is connected to the operation part of the air conditioning system 12.

A mode dial 74 (a rotary knob) is supported rotatably as an operation member within the right-hand side hole 20 in the cluster panel 14, and by the mode dial 74 being operated to rotate, the mode of the air conditioning system 12 in which air is sent into the passenger compartment is switched (between a mode in which air is sent to an upper body of an occupant, a mode in which air is sent to the upper body and feet of the occupant, a mode in which air is sent to the feet of the occupant and a passenger compartment side surface of a windshield of the vehicle, and a mode in which air is sent to the passenger compartment side surface of the windshield of the vehicle). A light guiding path 32, which is the same as the one described above, is provided within the mode dial 74, and a front surface of the light guiding path 32 is exposed to the passenger compartment, while a rear side of the light guiding path 32 is made to communicate with the interior of the left body 58.

An annular disc-shaped mode indication panel 76 is provided as an indication member on the front side of the cluster panel 14 in such a manner as to surround a circumference of the mode dial 74, and a front surface of the mode indication panel 76 is exposed to the passenger compartment. Mode indications 78 which indicate modes of air that is sent into the passenger compartment by the air conditioning system 12 are provided on the mode indication panel 76 in such a manner as to be associated with the front surface of the light guiding path 32 of the mode dial 74. The mode indication panel 76 has a light transmission property at the portion where the mode indications 78 are provided and is made to communicate with the interior of the left body 58 on a rear side thereof.

A mode cable 80 is provided as a connecting mechanism on a rear side of the left body 58, and the mode cable 80 is connected to the mode dial 74 via a bottom wall of the left body 58. The mode cable 80 is made to operate by the mode dial 74 being operated to rotate, and the mode cable 80 is connected to the operation part of the air conditioning system 12.

As has been described heretofore, the laps 50 are made to illuminate the interior of the right body 56 and the interior of the left body 58 via the interior of the central body 22, the communication holes 54 and the through holes 64, whereby the temperature indications 70 of the temperature indication panel 68 and the mode indications 78 of the mode indication panel 76 and the light guiding paths 32 of the A/M dial 66 and the mode dial 74 are made to be illuminated by light from the lamps 50.

Next, the function of the embodiment will be described.

In the heater operation unit 10 that is configured as has been described heretofore, in the cluster panel 14, the A/M dial 66 is disposed to the right of (just beside) of the central operation part 28 (the blower dial 30, the F/R lever 34, the A/C switch 42 and the rear defogger switch 44), while the mode dial 74 is disposed to the left of (just beside) the central operation part 28. Furthermore, the central body 22 is provided on a rear side of the central operation part 28, and the right body 56 is provided on a rear side of the A/M dial 66, the left body 58 being provided on a rear side of the mode dial 74. Then, the right body 56 is attached to a right-hand side of (just beside) the central operation part 28 and the left body 58 is attached to a left-hand side of (just beside) the central operation part 28.

Here, the right body 56 is made to be attached to the portion of the central body 22 which lies obliquely upwards to the right or obliquely downwards to the right, while the left body 58 is made to be attached to the portion of the central body 22 which lies obliquely upwards to the left or obliquely downwards to the left. Because of this, in the event that the cluster pane 114 is modified (in particular, the external shape of the cluster panel 14 and the positions of the right-hand side hole 18 and the left-hand side hole 20 are changed), the A/M dial 66 can easily be disposed at the portion which lies obliquely upwards to the right or obliquely downwards to the right of the central operation part 28, and the mode dial 74 can easily be disposed at the portion which lies obliquely upwards to the left or obliquely downwards to the left of the central operation part 28. This can facilitate a change in design of the heater operation unit 10, thereby making it possible to increase the degree of freedom in design of the heater operation unit 10.

Furthermore, the blower dial 30, the A/C switch 42 and the rear defogger switch 44, which need to be electrically connected to the electric circuit 46, are all provided on the front side of the central body 22 where the electric circuit 46 is provided. Moreover, the interior of the right body 56 is made to communicate with the interior of the central body 22 via the through hole 64 in the light body 56 and the communication hole 54 in the central body 22, while the interior of the left body 58 is made to communicate with the interior of the central body 22 via the through hole 64 in the left body 58 and the communication hole 54 in the central body 22, whereby the lamps 50 provided on the central body 22 are allowed to illuminate not only the central operation part 28 (including the central indication panel 36) but also the A/M dial 66 (including the temperature indication panel 68) and the mode dial 74 (including the mode indication panel 76). Because of this, the necessity of providing an electric circuit 46 and a lamp 50 in each of the right body 56 and the left body 58 is obviated, and the necessity of laying out a wiring harness in each of the right body 56 and the left body 58 is obviated, thereby making it possible to reduce effectively the production costs.

Note that while in the embodiment, the F/R lever 34 is configured as a lever which can be operated to move (slide) in a circle, the F/R lever 34 may be changed to adopt a configuration in which the F/R lever 34 is made as a dial which is operated to rotate or a switch which is operated to be depressed.

Furthermore, while in the embodiment, the configuration is adopted in which the A/M dial 66 and the mode dial 70 are made as the dials which can be operated to rotate, a configuration may be adopted in which the A/M dial 66 and the mode dial 74 are each made as a lever which can be operated to move or slide in a circle.

Figure 4:
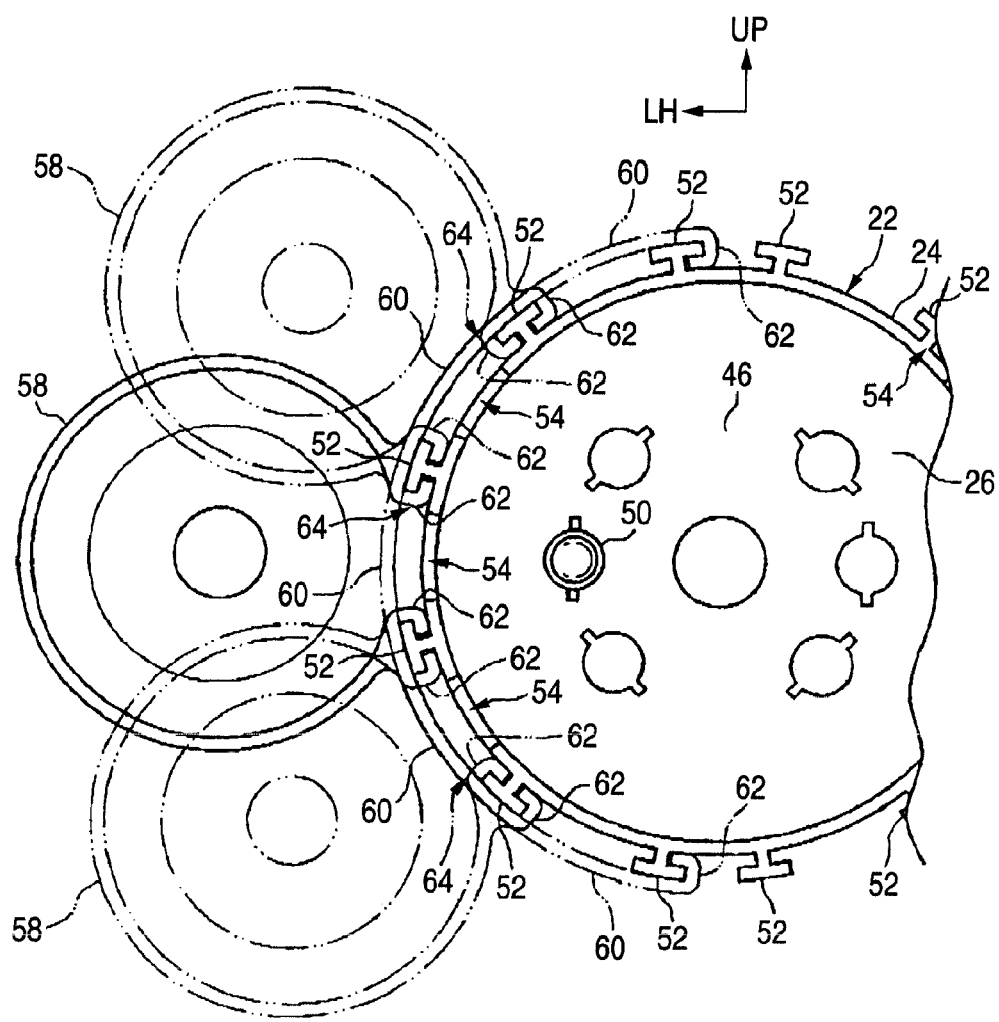
FIG. 4 is a sectional view showing another example of a central body and a left body of the heater operation unit according to the embodiment of the invention as viewed from the front side of the heater unit.

In addition, while in the embodiment, the configuration is adopted in which the four projections 52 are provided at each of the right-hand side portion and the left-hand side portion of the circumferential surface of the central body 22, a configuration as shown in FIG. 4 may be adopted in which six projections 52 are provided at each of the right-hand side portion and the left-hand side portion of the circumferential surface of the central body 22.

As this occurs, the six projections 52 are disposed at equal intervals in the circumferential direction of the central body at each of the right-hand side portion and the left-hand side portion of the circumferential surface of the central body. Furthermore, communication holes 54 are formed in the circumferential wall of the central body 22 at each of the right-hand side portion and the left-hand side portion between second and third, third and fourth and fourth and fifth projections 52 from the top.

By this configuration, the right body 56 can be attached to the portion lying obliquely upwards to the right of the central body 22, and at the same time, the left body 58 can be attached to the portion lying obliquely downwards to the left of the central body 22, while the right body 56 can be attached to the portion lying obliquely downwards to the right of the central body 22, and at the same time, the left body 58 can be attached to the portion lying obliquely upwards to the left of the central body 22. Because of this, the A/M dial 66 can be disposed at the portion lying obliquely upwards to the right of the central operation part 28, and at the same time, the mode dial 74 can be disposed at the portion lying obliquely downwards to the left of the central operation part 28, while the A/M dial 66 can be disposed at the portion lying obliquely downwards to the right of the central operation part 28, and at the same time, the mode dial 74 can be disposed at the portion lying obliquely upwards to the left of the central operation part 28.

In addition, while in the embodiment, the configuration is adopted in which the electric circuit 46 is made into the insert molded part (the insulator) in the central body 22 (the bottom wall of the rear body 26), a configuration may be adopted in which a printed circuit board to which the electric circuit 46 is provided is attached to the central body 22 (the bottom wall of the rear body 26).

What is claimed is:

1. An operation unit comprising:
a plurality of operation members provided in an air conditioning system for conditioning air inside a passenger compartment of a vehicle in such a manner as to be operated to control the air conditioning system;
a first rear-side member provided on a rear side of one of the plurality of operation members;
at least one second rear-side member provided on a rear side of the operation members on which the first rear-side member is not provided; and
an electrical functioning portion which is provided on the first rear-side member and has electrical functions for the operation member on which the rear-side member is provided and the operation members on which the second rear-side member is provided,
wherein the first rear-side member includes a plurality of attaching portions to which the second rear-side member is attachable.

2. The operation unit according to claim 1, wherein the electrical functioning portions illuminate the operation members on which the first rear-side member is provided and the operation member on which the second rear-side member is provided.

3. The operation unit according to claim 1, wherein the first and second rear-side members include through holes, respectively, so that interiors of the first and second rear-side members communicate each other.

* * * * *